United States Patent
Itagaki

(10) Patent No.: US 8,032,856 B2
(45) Date of Patent: Oct. 4, 2011

(54) METHOD AND SYSTEM FOR DESIGNING SEMICONDUCTOR INTEGRATED CIRCUIT PROVIDING DUMMY PATTERN IN DIVIDED LAYOUT REGION

(75) Inventor: Daishin Itagaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 349 days.

(21) Appl. No.: 12/219,054

(22) Filed: Jul. 15, 2008

(65) Prior Publication Data

US 2009/0055792 A1 Feb. 26, 2009

(30) Foreign Application Priority Data

Aug. 23, 2007 (JP) ................... 2007-216796

(51) Int. Cl.
*G06F 17/50* (2006.01)
(52) U.S. Cl. ......... 716/139; 716/125; 716/131; 438/697
(58) Field of Classification Search .................. 716/125, 716/131, 139; 438/697
See application file for complete search history.

(56) References Cited

U.S. PATENT DOCUMENTS

| | | | | |
|---|---|---|---|---|
| 5,459,093 A | * | 10/1995 | Kuroda et al. | 438/599 |
| 5,671,152 A | * | 9/1997 | Lavin et al. | 716/19 |
| 5,923,563 A | * | 7/1999 | Lavin et al. | 716/19 |
| 6,305,000 B1 | * | 10/2001 | Phan et al. | 716/5 |
| 6,484,300 B1 | * | 11/2002 | Kim et al. | 716/7 |
| 6,486,066 B2 | * | 11/2002 | Cleeves et al. | 438/692 |
| 6,718,527 B2 | * | 4/2004 | Li | 716/5 |
| 6,865,727 B2 | * | 3/2005 | Frerichs et al. | 716/19 |
| 6,905,967 B1 | * | 6/2005 | Tian et al. | 438/697 |
| 7,013,446 B2 | * | 3/2006 | Ohba et al. | 716/10 |
| 7,089,522 B2 | * | 8/2006 | Tan et al. | 716/11 |
| 7,146,593 B2 | * | 12/2006 | Travis et al. | 716/10 |
| 7,565,638 B2 | * | 7/2009 | Hoerold | 716/18 |
| 2003/0229875 A1 | * | 12/2003 | Smith et al. | 716/10 |
| 2004/0083438 A1 | * | 4/2004 | Ohba et al. | 716/2 |
| 2005/0044520 A1 | * | 2/2005 | Vuong et al. | 716/12 |

FOREIGN PATENT DOCUMENTS

| | | |
|---|---|---|
| JP | 2004-39951 | 2/2004 |
| JP | 2006-60051 | 8/2006 |

* cited by examiner

*Primary Examiner* — Naum Levin
(74) *Attorney, Agent, or Firm* — McGinn IP Law Group, PLLC

(57) ABSTRACT

A method of designing a semiconductor integrated circuit, includes dividing a layout area in which a wiring pattern is disposed, into a plurality of division areas, determining a dummy pattern disposition area provided in each of the plurality of division areas, adding a dummy pattern to the dummy pattern disposition area of each of the plurality of division areas, and combining division areas to which the dummy pattern is added. The dummy pattern disposition area is arranged away from at least one of boundaries between a corresponding division area of the plurality of division areas and adjacent division areas.

18 Claims, 17 Drawing Sheets

RB: BOUNDARY PERIPHERAL AREA

METHOD AND SYSTEM FOR DESIGNING SEMICONDUCTOR INTEGRATED CIRCUIT PROVIDING DUMMY PATTERN IN DIVIDED LAYOUT REGION

BACKGROUND OF THE INVENTION

1. Field of the Invention

The present invention relates to a technique for designing a semiconductor integrated circuit. In particular, the invention relates to a technique for designing a semiconductor integrated circuit including dummy patterns.

2. Description of Related Art

If a semiconductor integrated circuit is designed, then areas having dense wiring patterns and areas having sparse wiring patterns may be generated therein. In other words, areas having high wiring pattern densities (hereafter referred to as a "pattern density") and areas low wiring pattern densities may be generated. Such uneven pattern densities may cause various problems in the manufacturing process of a designed circuit.

For example, when a chemical mechanical polishing (CMP) process is performed, there occur differences in polishing characteristics between areas having high pattern densities and areas having low pattern densities. As a result, there occurs a phenomenon, called "dishing," in which a surface of wiring (e.g., Cu wiring) is recessed in the form of a dish (e.g., a concavity). Dishing means a reduction in flatness of wiring and a reduction in film thickness and causes uneven wiring resistances and an increase in wiring resistance.

In order to suppress generation of such a defect in the manufacturing process, it is important to make pattern densities as uniform as possible in the stage of circuit design. For this reason, "dummy patterns" as well as wiring patterns (signal wiring, power supply lines, ground lines, etc.) of the circuit are generally added to a design layout (see Patent Documents 1 and 2). A dummy pattern is a wiring pattern unnecessary for functions of a designed circuit and is also called as dummy wiring or a dummy metal. Addition of dummy patterns makes pattern densities more uniform, thereby suppressing generation of dishing or the like.

Described in Patent Document 1 is a technique for improving local uniformity in wiring pattern. For that purpose, a layout area is divided into multiple division areas and a dummy pattern is inserted between designed patterns in each division area.

Described in Patent Document 2 is a method for forming a dummy pattern having highly uniform cover rates. According to this method, a dummy pattern formation area is divided into multiple dummy pattern formation unit areas. Subsequently, multiple check ranges having an area larger than the dummy pattern formation unit area are set. The multiple check ranges overlap each other. Subsequently, a temporary cover rate of a dummy pattern to be formed in a dummy pattern formation unit area in each check range is calculated. By averaging the calculated temporary cover rates, a final cover rate is determined. A dummy pattern having an area corresponding to the final cover rate is formed in each dummy pattern formation unit area.

[Patent Document 1] Japanese Unexamined Patent Application Publication No. 2004-39951

[Patent Document 2] Japanese Unexamined Patent Application Publication No. 2006-60051

As described above, in order to improve the yield of a semiconductor integrated circuit, it is important to previously dispose a dummy pattern in the design stage. However, the time required to perform a dummy pattern disposition process is increased as the size of a designed circuit is increased. This increases the design TAT (turn around time). For this reason, it is considered to divide a layout area into multiple division areas and then perform dummy pattern disposition processes "simultaneously" with respect to the multiple division areas so as to reduce the design TAT.

Here, the inventor was focused on the following point. That is, if a layout area is divided carelessly and dummy pattern disposition processes are performed with respect to the multiple division areas separately, then the following problems may occur.

For example, a dummy pattern disposed in a division area may excessively come close to a wiring pattern in an adjacent division area. That is, a design rule error (spacing error) may occur between the patterns in the adjacent division areas. This is because dummy pattern disposition processes are performed on the division areas separately.

In order to stabilize the electric properties of a dummy pattern to reduce noise, it is desirable to couple a disposed dummy pattern to a power supply line or a ground line. Here, a case is considered where a first dummy pattern is disposed in a division area, a second dummy pattern is disposed in an adjacent division area, and the first and second dummy patterns are coupled to a power supply line and a ground line, respectively. In this case, it is considered that the first and second dummy patterns make contact with each other or overlap each other on the boundary between the division areas. Thus, a short circuit occurs between the first and second dummy patterns.

SUMMARY OF THE INVENTION

According to a first aspect of the present invention, a method for designing a semiconductor integrated circuit includes, dividing a layout area in which a wiring pattern is disposed, into a plurality of division areas, determining dummy pattern disposition areas to be included in the plurality of division areas, with respect to the division areas, adding dummy patterns to the dummy pattern disposition areas of the division areas, and combining the plurality of division areas to which the dummy patterns have been added. The dummy pattern disposition areas are each located away from at least one of boundaries between a corresponding division area of the division areas, and adjacent division areas.

As described above, the layout area is divided into the multiple division areas. Therefore, dummy pattern disposition processes are performed "simultaneously." Also, dummy pattern disposition areas in which the dummy patterns are to be disposed are each located away from at least one of the boundaries between the corresponding division area and adjacent division areas. As a result, occurrence of a design rule error or a short circuit is prevented around the at least one boundary. That is, the design TAT is reduced while suppressing occurrence of a design rule error or a short circuit.

According to a second aspect of the present invention, a system for designing a semiconductor integrated circuit includes a storage in which layout data representing a wiring pattern is stored; a first calculator, and a plurality of second calculators. The first calculator reads the layout data from the storage and divides a layout area in which the wiring pattern is disposed, into a plurality of division areas. Also, the first calculator determines dummy pattern disposition areas to be included in the plurality of division areas, with respect to the division areas. Here, the dummy pattern disposition areas are each located away from at least one of boundaries between a corresponding division area of the division areas, and adjacent division areas.

Further, the first calculator creates a plurality of pieces of division area data with respect to the plurality of division areas. Here, the plurality of pieces of division area data each represent a layout of a corresponding division area of the division area, and a corresponding dummy pattern disposition area of the dummy pattern disposition areas. The plurality of second calculators receive the plurality of pieces of division area data and simultaneously perform processes of adding dummy patterns to the dummy pattern disposition areas with respect to the plurality of division areas. The first calculator receives a plurality of pieces of division area data to which the dummy patterns have been added and combines the plurality of division areas.

According to the present invention, the design TAT is reduced while suppressing occurrence of a design rule error or a short circuit.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

1. First Exemplary Embodiment

Figure 1:
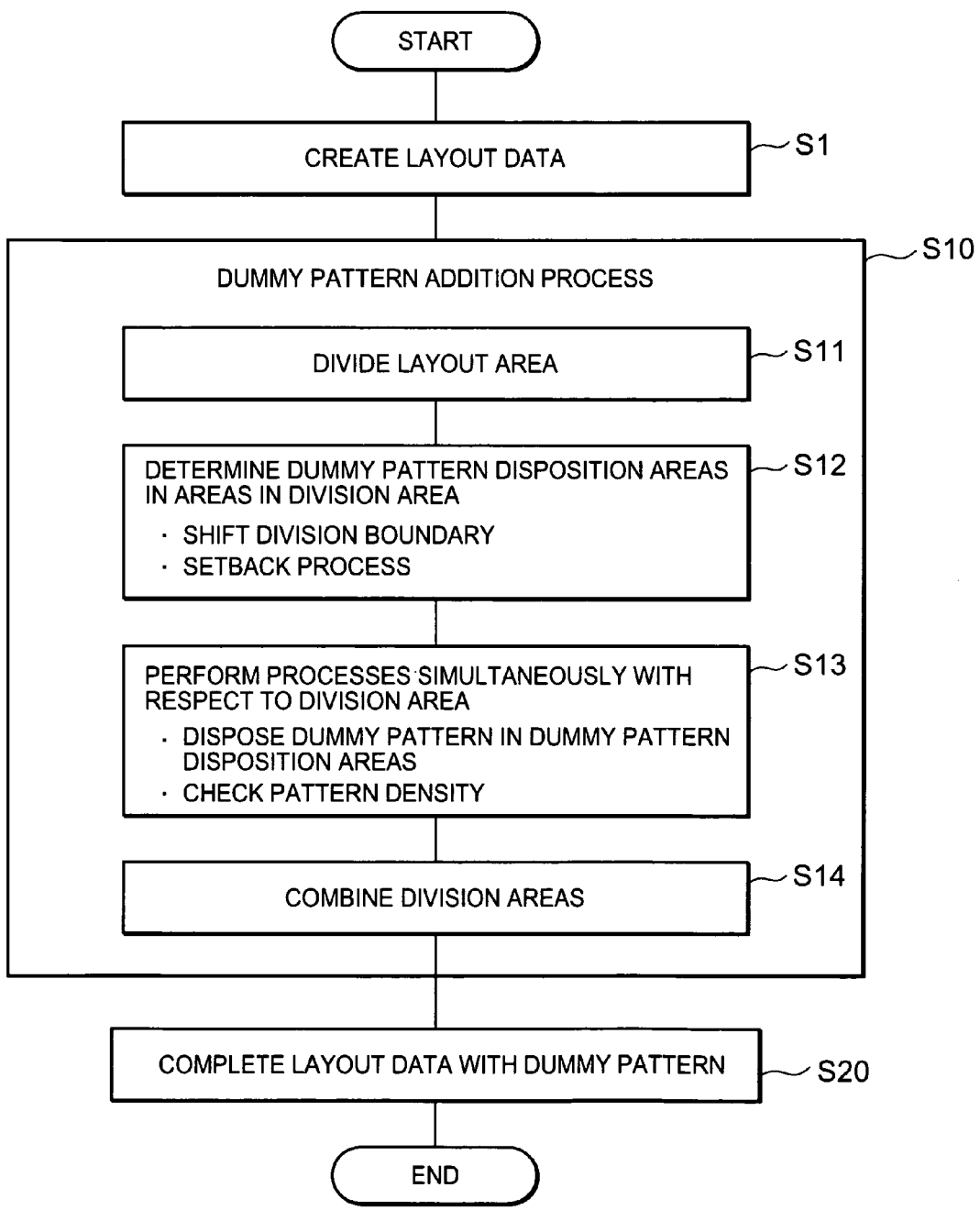
FIG. 1 is a flowchart showing a method for designing a semiconductor integrated circuit according to a first exemplary embodiment of the present invention.

FIG. 1 is a flowchart showing a method for designing a semiconductor integrated circuit according to a first exemplary embodiment of the present invention.

Step S1: First, layout data of a designed circuit is created according to a known technique. The layout data refers to layouts of a designed circuit, that is, layouts of various cells, wiring between cells, power supply lines, ground lines, and the like. As a matter of course, the layout data at this point of time is layout data to which dummy patterns are yet to be added.

Figure 2:
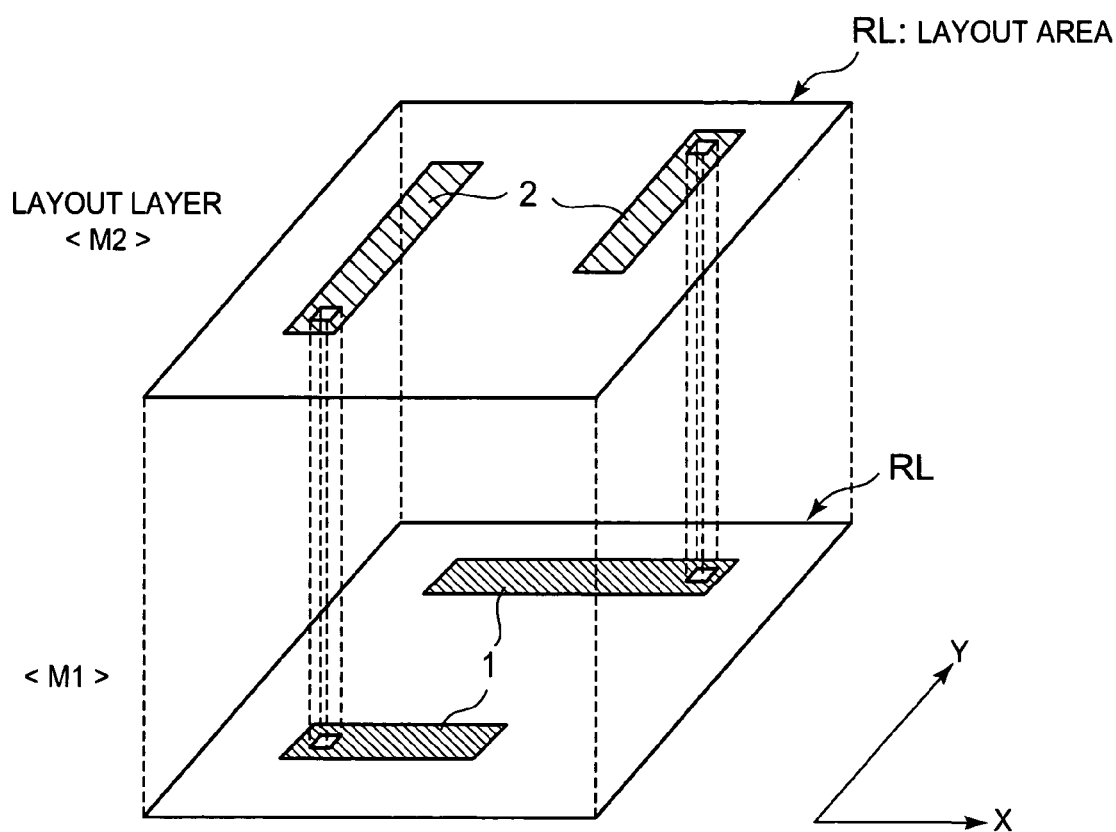
FIG. 2 conceptually shows layout data of a semiconductor integrated circuit.

FIG. 2 conceptually shows layout data of a semiconductor integrated circuit (semiconductor chip). The layout data includes multiple layout layers. Each layout layer has a layout area RL in which a wiring pattern and the like are disposed. For example, FIG. 2 shows two different layout layers M1 and M2 corresponding to two different wiring layers. A wiring pattern 1 is disposed along the X direction in the layout area RL of the layout layer M1, while a wiring pattern 2 is disposed along the Y direction in the layout area RL of the layout layer M2. The X direction and Y direction intersect each other and are typically perpendicular to each other. The wiring pattern 1 running along the X direction in the layout layer M1 and the wiring pattern 2 running along the Y direction in the layout layer M2 are coupled to each other through a via. Note that the wiring patterns 1 and 2 are wiring patterns necessary for operations of the designed circuit, such as signal wiring.

Step S10: After the layout data of the designed circuit is created, a "dummy pattern (dummy metal)" is added to the designed layout. That is, the dummy pattern is added to the layout data created in step S1. The dummy pattern is a wiring pattern unnecessary for operations or functions of the designed circuit and is a pattern different from the existing wiring patterns 1 and 2. The addition of the dummy pattern makes the pattern densities more uniform, thereby suppressing occurrence of dishing or the like. Hereafter, the process performed in step S10 will be described in detail.

Step S11: The time required to perform a dummy pattern disposition process is increased as the size of a designed circuit is increased. This increases the design TAT. For this reason, according to this embodiment, dummy pattern disposition processes are performed simultaneously in a distributed manner. For this purpose, the layout area RL of each layout layer is divided (partitioned) into multiple division areas.

Figure 3:
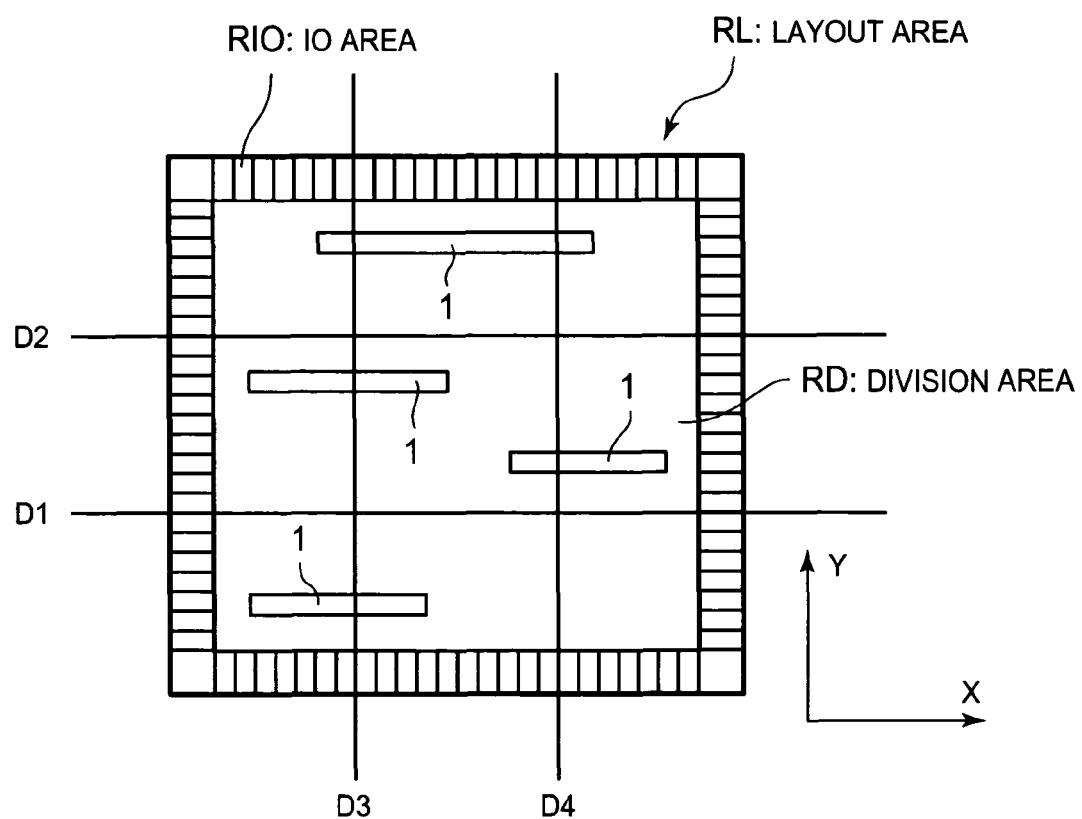
FIG. 3 is a conceptual diagram showing a layout area division process (step S11)

FIG. 3 shows an example of divisions of the layout area RL. As an example, the layout area RL of the layout layer M1 is shown. An IO area RIO exists on the periphery of the layout area RL. The wiring pattern 1 is disposed along the X direction in an area enclosed by the IO area RIO.

As shown in FIG. 3, the layout area RL is divided into multiple division areas RD by division boundaries (division lines) D1 to D4. The existing wiring pattern 1 may be divided by the division lines. The boundary between a division area RD and an adjacent division area is aligned with any of the division lines D1 to D4. That is, the boundary between adjacent division areas RD is aligned with any of the division lines D1 to D4. In this sense, the division lines D1 to D4 will be hereafter referred to as "division boundaries." The division lines D1 and D2 each run along the X direction, while the division lines D3 and D4 run along the Y direction. The same process is performed with respect to other layout layers. Note that the size or shape of each division area RD is arbitrarily established.

Step S12: An area where disposition of a dummy pattern is allowed is determined with respect to each of the multiple division areas RD. Hereafter, such areas will be referred to as "dummy pattern disposition areas RP." A dummy pattern disposition area RP is an area included in a division area RD and has the following characteristics.

Figure 4:
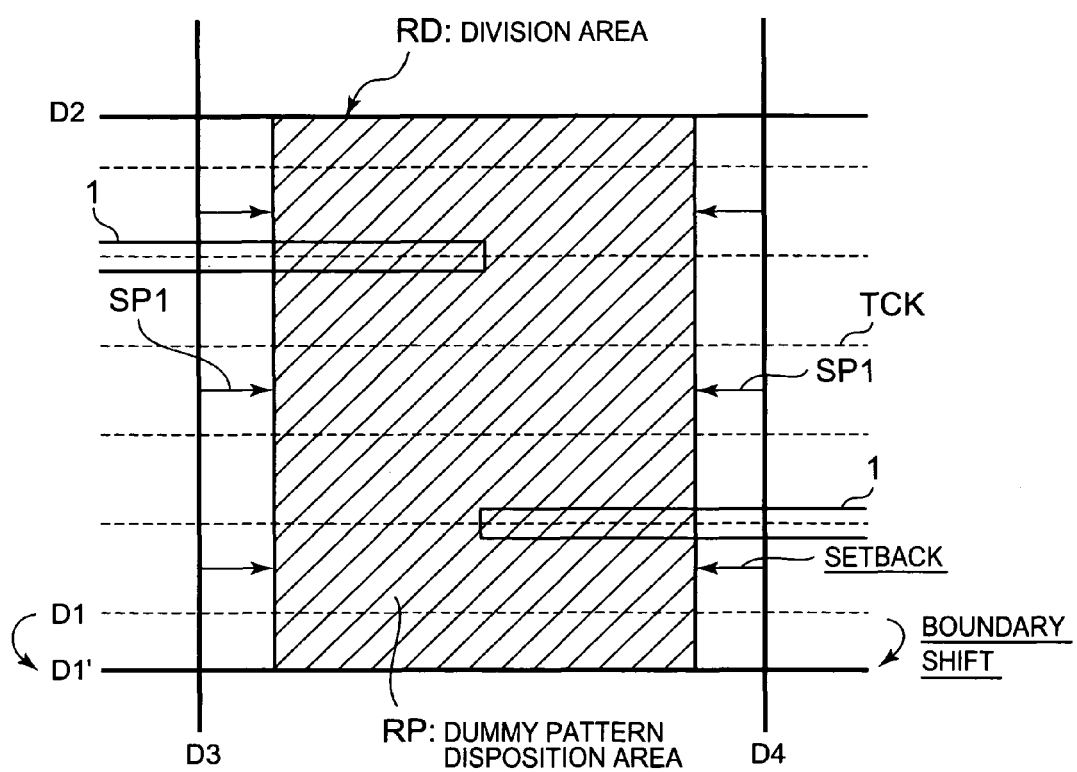
FIG. 4 is a conceptual diagram showing an example of a dummy pattern disposition area.

FIG. 4 shows a division area RD of the layout layer M1 and a dummy pattern disposition area RP included in the division area RD. In the layout layer M1, the wiring pattern 1 and a dummy pattern are disposed on wiring tracks TCK running along the X direction. The wiring tracks TCK are reference lines for wiring and their pitch is defined by a design rule. In FIG. 4, the boundaries between the division area RD and adjacent division areas include the division boundaries D1 to D4. Among these division boundaries, the division boundaries D1 and D2 run along the X direction and are in parallel with the wiring tracks TCK, while the division boundaries D3 and D4 run along the Y direction and intersect (are perpendicular to) the wiring tracks TCK.

The dummy pattern disposition area RP according to this embodiment is located away from at least one of the division boundaries D1 to D4. More specifically, the dummy pattern disposition area RP is located away from the division boundaries D3 and D4 intersecting the wiring tracks. TCK (X direction) by a predetermined distance SP1. The predetermined distance SP1 is, for example, the smallest wiring interval defined by the design rule. As is understood from the above-description, the dummy pattern disposition area RP is set so that it is located away from the division boundaries D3 and D4 intersecting the wiring tracks TCK to some extent.

On the other hand, with respect to the division boundaries (D1, D2) parallel with the wiring tracks TCK, it is checked whether these division boundaries overlap any of the wiring tracks TCK. If any of these division boundaries overlaps (is aligned with) any wiring track TCK, then the division boundary is parallel-moved to a position that does not overlap the wiring track TCK. The reason will be described later. In an example shown in FIG. 4, the division boundary D1 running along the X direction overlaps one of the wiring tracks TCK. In this case, the division boundary D1 is changed to a division boundary D1' by performing a parallel movement process.

That is, in determining a dummy pattern disposition area RP, the division boundaries parallel with the wiring tracks TCK are parallel-moved (shifted) as necessary. Hereafter, this process will be referred to as a "division boundary shift process." Also, by reducing (setting back) the division area RD from the division boundaries intersecting the wiring tracks TCK toward the inside of the division area RD by the predetermined distance SP1, the dummy pattern disposition area RP is set. Hereafter, in this specification, this process will be referred to as a "setback" process." By performing this process, the dummy pattern disposition area RP is located away from the division boundaries D3 and D4 intersecting the wiring tracks TCK by the predetermined distance SP1. On the other hand, the dummy pattern disposition area RP is not located away from the division boundaries D1' and D2 parallel with the wiring tracks TCK. Note that if none of the division boundaries D1 and D2 parallel with the wiring tracks TCK is aligned with any wiring track TCK, the dummy pattern disposition area RP is not located away from any of the division boundaries D1 and D2.

Figure 5:
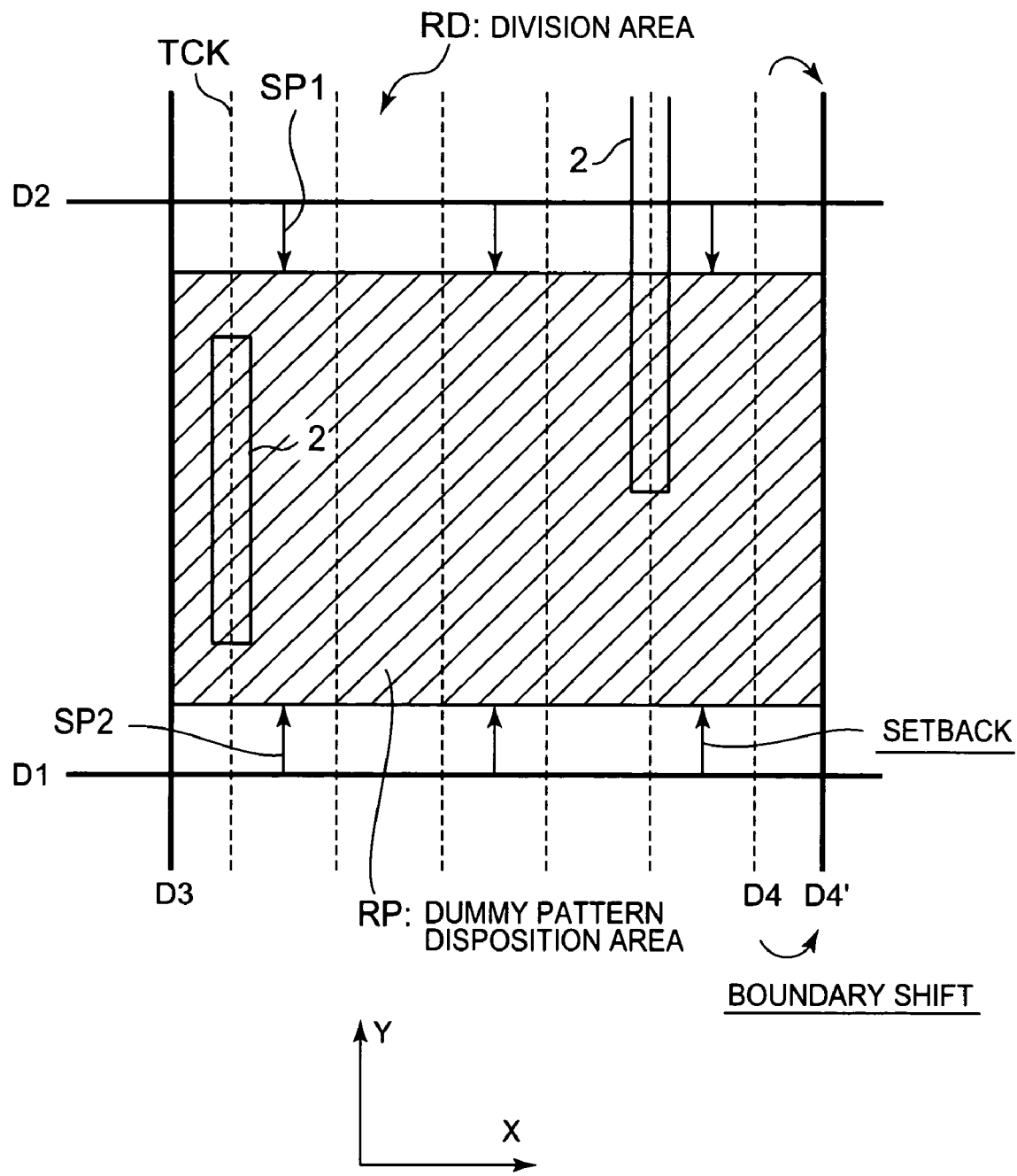
FIG. 5 is a conceptual diagram showing another example of the dummy pattern disposition area.

FIG. 5 shows a division area RD of another layout layer M2 and a dummy pattern disposition area RP included in the division area RD. In the layout layer M2, the wiring pattern 2 and a dummy pattern are disposed on wiring tracks TCK running along the Y direction. In FIG. 5, the boundaries between the division area RD and adjacent division areas include division boundaries D1 to D4. Among these division boundaries, the division boundaries D1 and D2 run along the X direction and intersect (are perpendicular to) the wiring tracks TCK, while the division boundaries D3 and D4 run along the Y direction and are in parallel with the wiring tracks TCK.

In an example shown in FIG. 5, the division boundary D4 running along the Y direction overlaps a wiring track TCK. Therefore, the division boundary D4 is changed to a division boundary D4' by performing a parallel movement process. Also, the above-described setback process is performed with respect to the division boundaries D1 and D2 intersecting the wiring tracks TCK. As a result, the dummy pattern disposition area RP is located away from the division boundaries D1 and D2 intersecting the wiring tracks TCK by a predetermined distance SP2. On the other hand, the dummy pattern disposition area RP is not located away from any of the division boundaries D3 and D4' parallel with the wiring tracks TCK. Note that if none of the division boundaries D3 and D4 parallel with the wiring tracks TCK is aligned with any wiring track TCK, the dummy pattern disposition area RP is not located away from any of the division boundaries D3 and D4.

Figure 6:
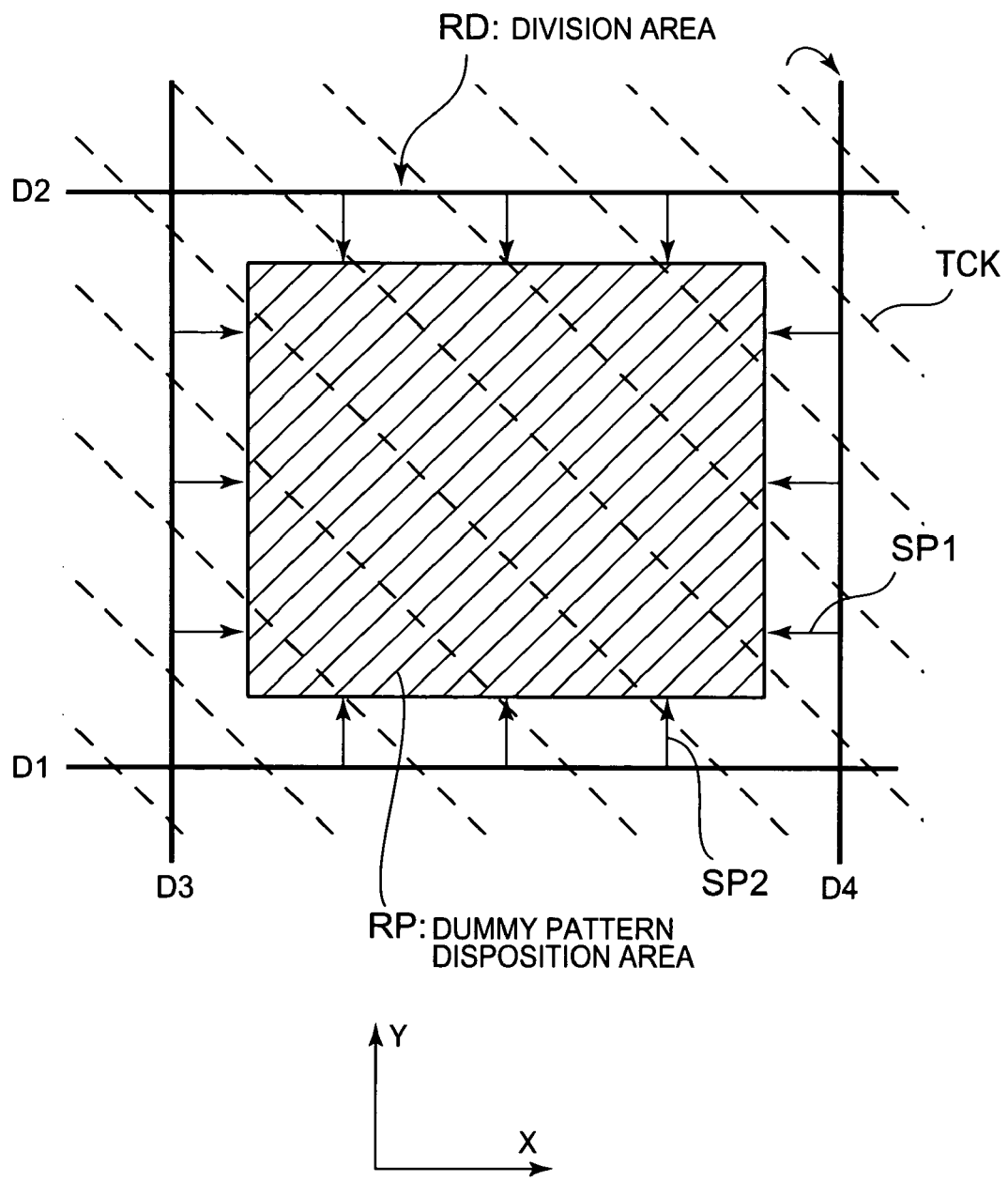
FIG. 6 is a conceptual diagram showing yet another example of the dummy pattern disposition area.

FIG. 6 shows a case where wiring tracks TCK are oblique to the X and Y directions. In this case, there are no division boundaries parallel with the wiring tracks TCK and all the division boundaries D1 to D4 intersect the wiring tracks TCK. Therefore, the setback process is performed with respect to all the division boundaries D1 to D4. As a result, the dummy pattern disposition area RP is located away from the division boundaries D1 and D2 by the distance SP2 and away from the division boundaries D3 and D4 by the distance SP1.

FIGS. 4 to 6 show cases where all the sides of the division area are aligned with the division boundaries. In other words, FIGS. 4 to 6 show cases where the four directions of the division area RD are enclosed by other division areas. On the other hand, as shown in FIG. 3, the outmost division areas RD (division areas RD including the IO area RIO) of the layout area RL are in contact with other division areas only by some sides thereof. In this case, the above-described setback process is performed only with respect to the sides thereof in contact with other division areas RD, that is, only with respect to the division boundaries. The setback process need not be performed with respect to the sides thereof that do not form boundaries with other division areas RD. Therefore, there is a possibility that a dummy pattern disposition area RP in a division area RD is located away only from one side (division boundary) of the division area RD and is not located away from the other sides thereof.

The dummy pattern disposition area RP determined in this way is an area where the disposition of a dummy pattern is allowed in the next step S13. On the other hand, areas other than the dummy pattern disposition area RP in the division area RD are areas where the disposition of a dummy pattern is prohibited.

Figure 7:
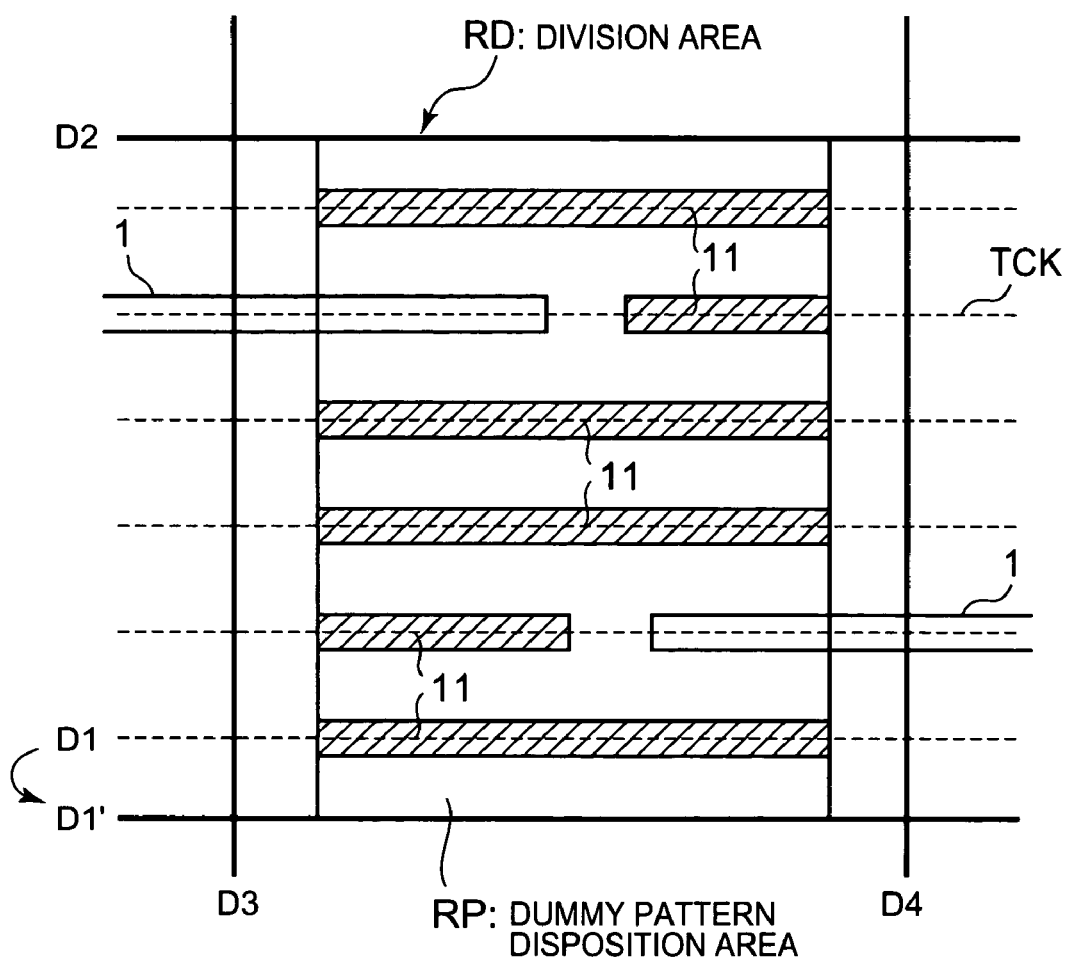
FIG. 7 is a conceptual diagram showing a dummy pattern addition process (step S13)

Step S13: Next, a dummy pattern is additionally disposed in the dummy pattern disposition area RP of each division area RD. For example, FIG. 7 shows the disposition of a dummy pattern in a division area RD of the layout layer M1. In this division area RD, the existing wiring pattern 1 is disposed along the X direction on wiring tracks TCK. Further, in the dummy pattern disposition area RP, the dummy pattern 11 is additionally disposed on the wiring tracks TCK along the X direction. In this case, the dummy pattern 11 is added so that no design rule violation occurs between the dummy pattern and existing wiring pattern 1.

Each dummy pattern 11 is coupled to a power supply line or a ground line. This is because that if the dummy pattern 11 is in a floating state, the electric properties of the dummy pattern 11 are unknown and noise is apt to occur. In order to stabilize the electric properties to reduce noise, the disposed dummy pattern 11 is coupled to a power supply line or a ground line.

Further, with respect to each division area RD, it is checked whether the pattern density (metal density) satisfies a predetermined criterion. The pattern density is the area ratio (share) of a wiring pattern and a dummy pattern in an area to the area. In order to effectively suppress dishing or the like, the dummy pattern 11 is disposed so that the pattern density of each division area RD satisfies the predetermined criterion.

Figure 8:
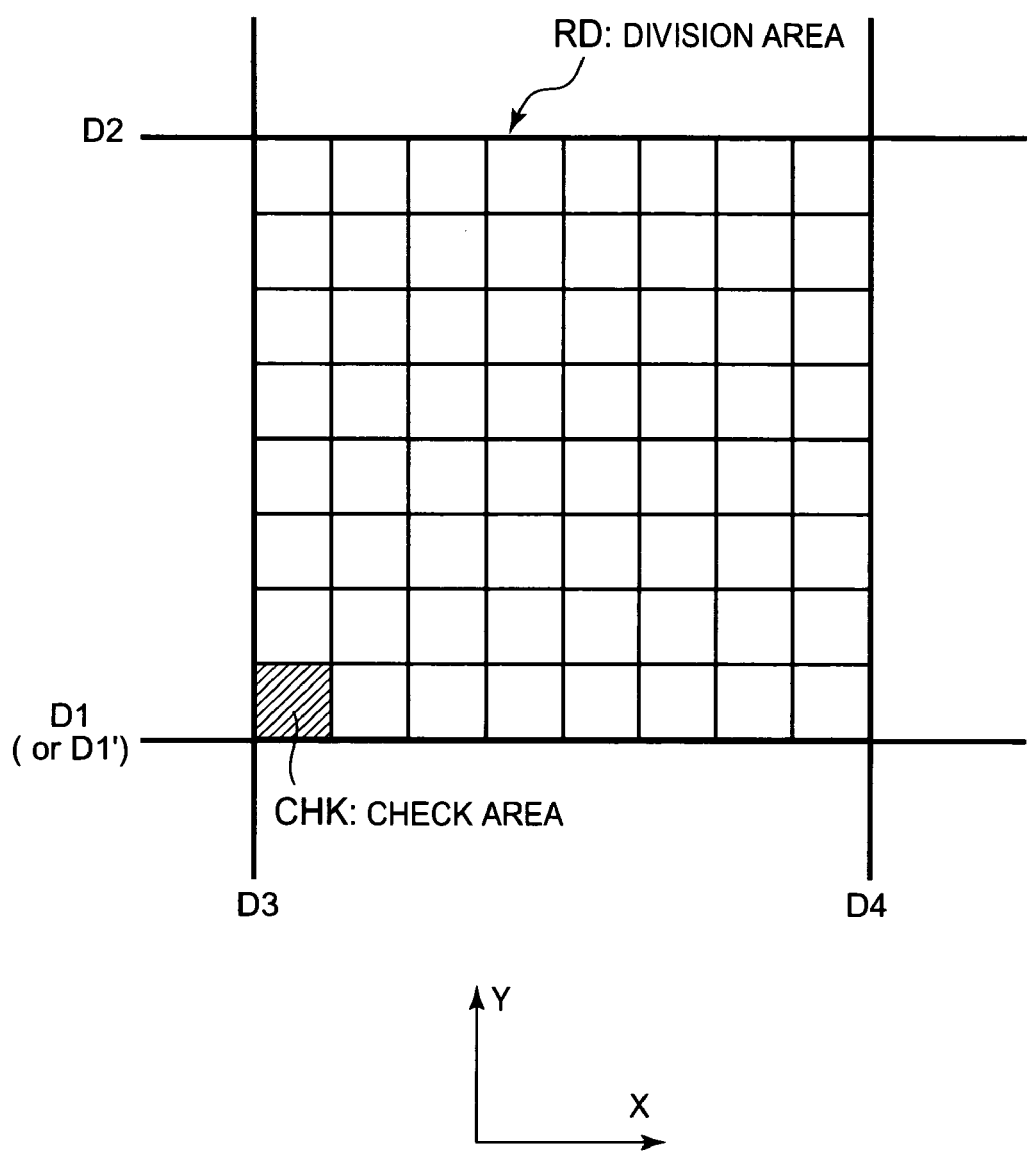
FIG. 8 is a conceptual diagram showing a pattern density check.

FIG. 8 is a diagram showing an example of a method for checking the pattern density. As shown in FIG. 8, a small check area CHK is defined in one of the division areas RD. It is checked whether the pattern density of this small check area CHK satisfies a predetermined criterion. Then, by shifting the check area CHK sequentially in the division area RD, the entire division area RD undergoes the pattern density check. If the pattern density does not satisfy the predetermined criterion, the dummy pattern 11 is re-disposed. Note that the technique shown in FIG. 8 is also used when checking the pattern density at a general chip level. Therefore, the division boundaries (D1 to D4) may be set in the above-described step S11 so that the check area CHK in the division area RD matches the check area at a chip level. Thus, a check accuracy equivalent to that at the general chip level is obtained.

According to this embodiment, the layout area RL is divided into the multiple division areas RD. The above-described disposition check of the dummy pattern 11 and the above-described pattern density check are performed with respect to the multiple division areas RD simultaneously in a distributed manner. Thus, the design TAT is reduced. Note that only some division areas RD may be subjected to the simultaneous distributed processes. Also, division areas RD to be subjected to the simultaneous distributed processes may be specified by a user.

Figure 9:
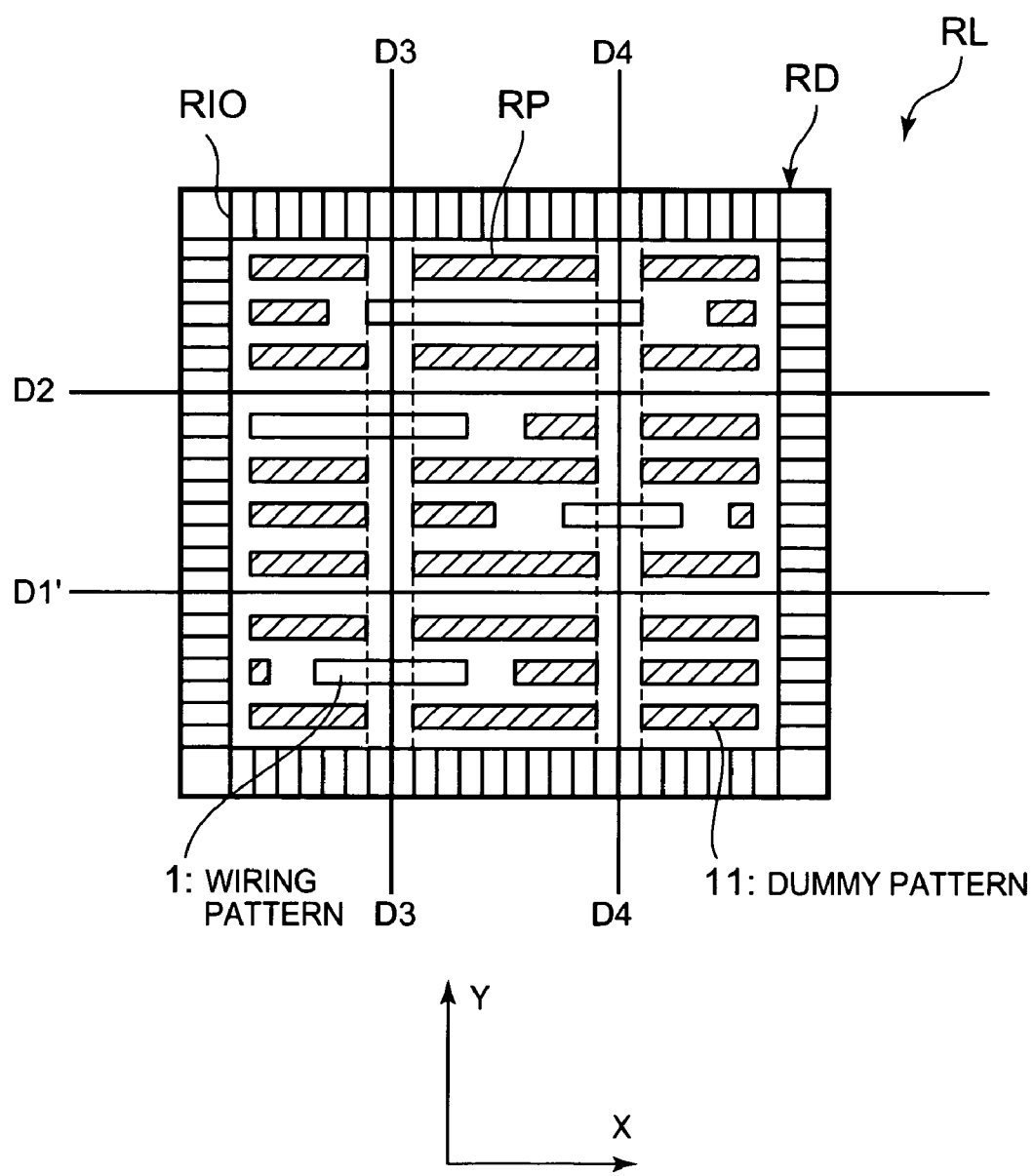
FIG. 9 is a conceptual diagram showing a division area combination process (step S14)

Step S14: Subsequently, the multiple division areas RD, to each of which the dummy pattern 11 has been added, are combined. FIG. 9 shows an example of the layout RL after the division areas RD are combined. The dummy patterns 11 are additionally disposed in the layout area RL, compared with the layout area RL shown in FIG. 3. The dummy patterns 11 are located away from the division boundaries D3 and D4 by a predetermined distance. This prevents occurrence of a design rule error or a short circuit around the division boundaries D3 and D4 after the division areas RD area are combined. That is, the design TAT is reduced while suppressing occurrence of a design rule error or a short circuit.

Step S20: The same process is performed on each layout layer. In this way, "layout data with dummy pattern," which is layout data to which a dummy pattern 11 has been added, is completed.

According to this embodiment, the layout area RL is divided into the multiple division areas RD. Therefore, the above-described disposition check of the dummy pattern 11 and the above-described pattern density check are performed with respect to the multiple division areas RD simultaneously in a distributed manner. By performing of the simultaneous distributed processes, the time required to dispose a dummy pattern is significantly reduced. That is, the design TAT is significantly reduced.

Figure 10:
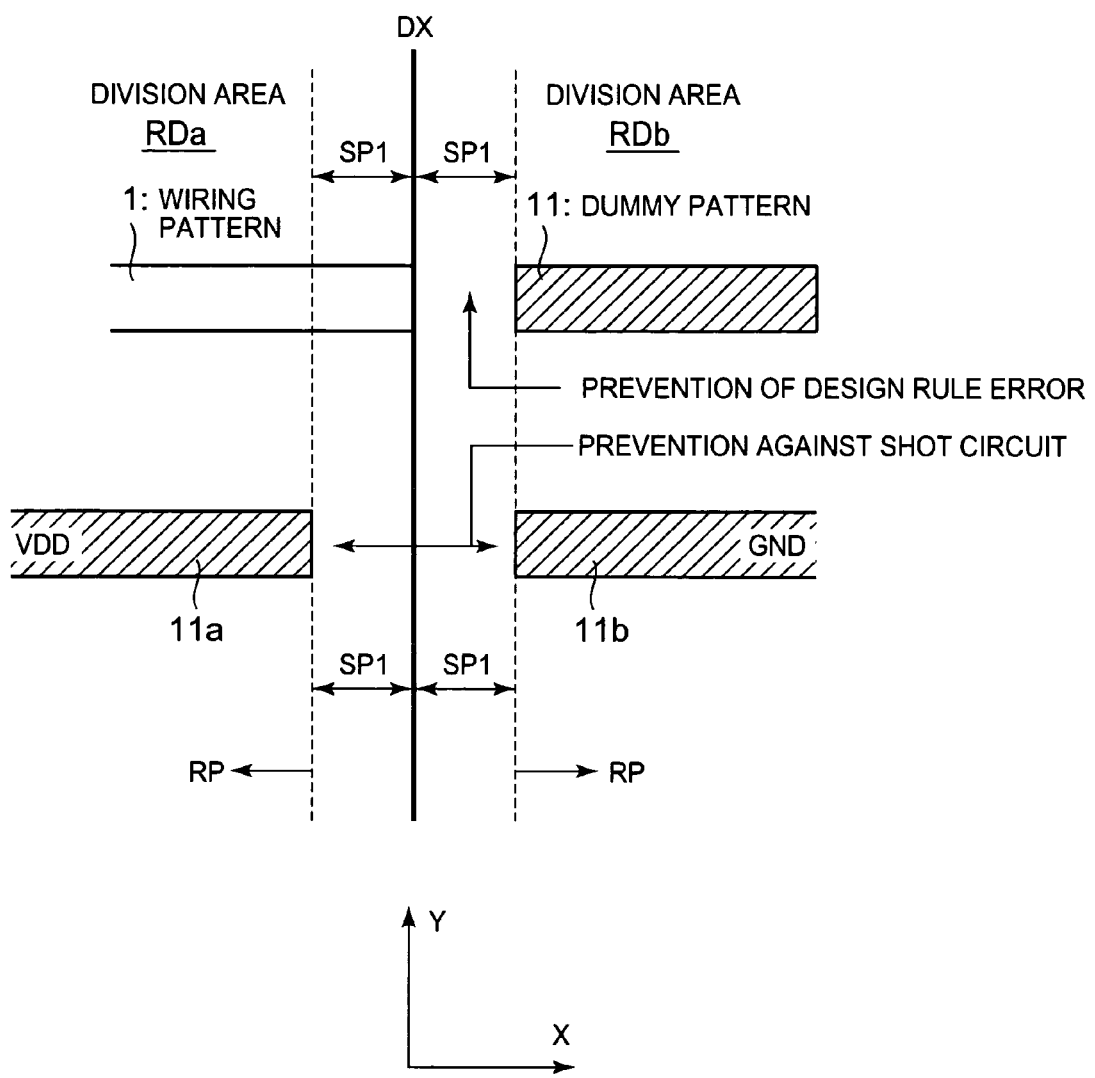
FIG. 10 is a conceptual diagram showing an effect of the embodiment of the present invention.

Also, when the simultaneous distributed processes are performed, occurrence of a design rule error or a short circuit around the division boundaries is suppressed. FIG. 10 is a diagram showing that effect. In FIG. 10, the division areas RDa and RDb are adjacent to each other with a division boundary DX intersecting wiring tracks therebetween. The above-described setback process has been performed with respect to the division boundary DX. That is, the dummy pattern disposition area RP is located away from the division boundary DX intersecting the wiring tracks by the predetermined distance SP1.

For example, in the division area RDa, the wiring pattern 1 is disposed so as to reach the division boundary DX. On the other hand, the dummy pattern 11 is disposed away from the division boundary DX by at least the distance SP1 (smallest wiring width). Therefore, no design rule error (spacing error) occurs between the wiring pattern 1 and dummy pattern 11. In other words, even if the existing wiring pattern 1 reaches the division boundary DX, occurrence of a design rule error around the division boundary DX is prevented.

In the division area RDa, the dummy pattern 11a is coupled to a power supply line (VDD). On the other hand, the dummy pattern 11b is coupled to a ground line (GND). If no setback process is performed, the dummy patterns 11a and 11b may make contact with each other on the division boundary DX, thereby causing a short circuit. However, since a setback process is performed according to this embodiment, the dummy patterns 11a and 11b are each disposed away from the division boundary DX by at least the predetermined distance SP1. This prevents the dummy patterns 11a and 11b from making contact with each other. That is, occurrence of a short circuit between the power supply line and ground line is prevented.

As described above, according to this embodiment, occurrence of a design rule error or a short circuit around the division boundary DX after combining the division areas RD is prevented. Conversely, since occurrence of a design rule error or a short circuit is prevented, simultaneous distributed processes, in each of which the design TAT is reduced, can be performed. Thus, the design TAT is reduced while preventing occurrence of a design rule error or a short circuit. Note that after combining the division areas RD, an area having a relatively low pattern density occurs around the division boundary DX. As a result, a pattern density error may very rarely occur around the division boundary DX. A countermeasure against such an error will be described in a second embodiment below.

Figure 11:
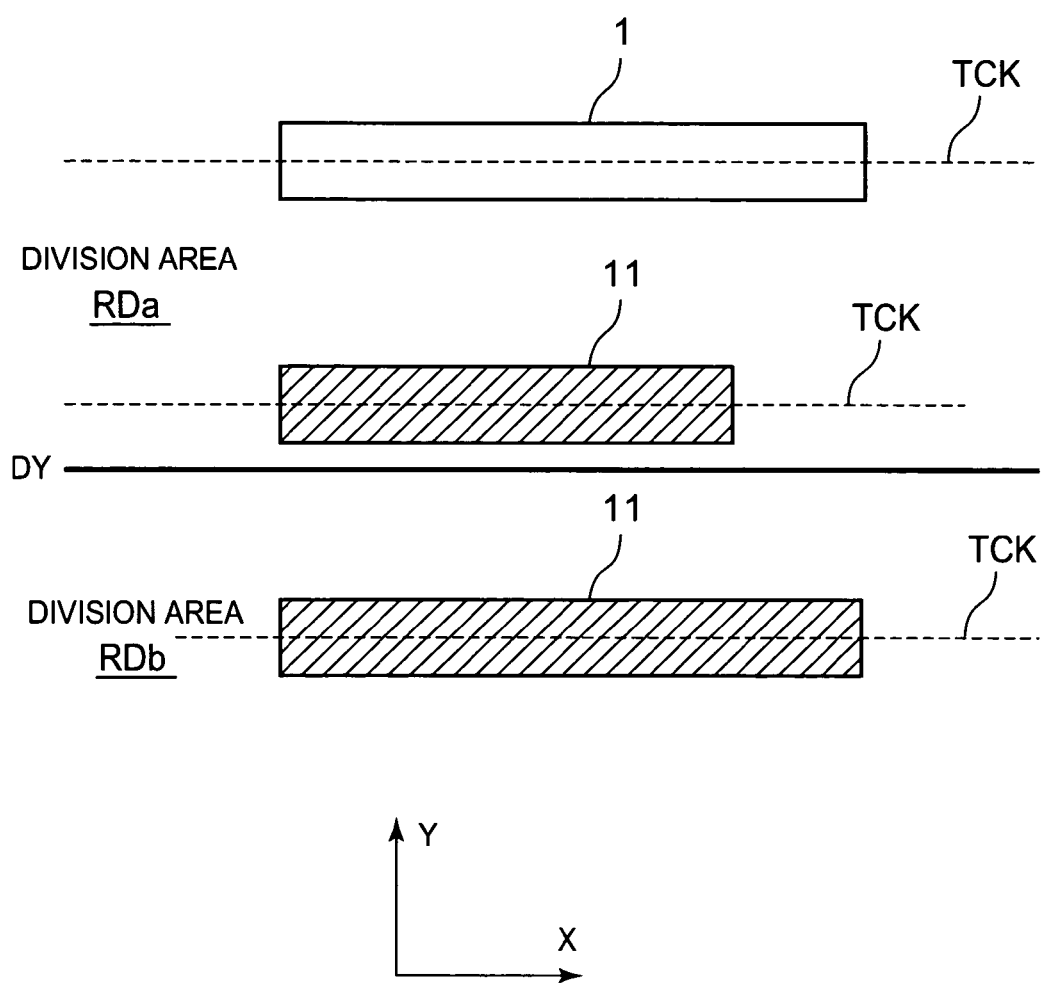
FIG. 11 is a conceptual diagram showing an effect of the embodiment of the present invention.

FIG. 11 shows an example in which patterns are disposed around a division boundary DY parallel with wiring tracks TCK. In FIG. 11, the division areas RDa and RDb are adjacent to each other with the division boundary DY therebetween. According to this embodiment, no setback process is performed with respect to the division boundary DY parallel with the wiring tracks TCK. This is because the wiring pattern 1 and dummy pattern 11 are disposed on the wiring tracks TCK defined by a design rule and therefore no design rule error occurs around the division boundary DY.

As a comparative example, a case is considered where a setback process is performed with respect to the division boundary DY parallel with the wiring tracks TCK. In this case, some of the wiring tracks TCK around the division boundary DY get out of the dummy pattern disposition area RP; therefore, the dummy pattern 11 is no longer additionally disposed on such wiring tracks TCK. This means that some of the wiring tracks TCK are lost. Therefore, the disposition accuracy of the dummy pattern 11 for suppressing dishing or the like deteriorates. Or, the probability that a pattern density error occurs around the division boundary DY after combining the division areas RD is increased.

In this embodiment, setback processes are not uniformly performed with respect to all the division boundaries. Setback processes are performed only with respect to division boundaries intersecting the wiring tracks TCK. Since setback processes are not uniformly performed, the probability that a pattern density error occurs is reduced accordingly. According to this embodiment, it can be said that occurrence of a pattern density error around a division boundary is prevented as much as possible.

Also, as shown in FIG. 11, the division boundary DY parallel with the wiring tracks TCK does not overlap any of the wiring tracks TCK. This is because the division boundary shift process has been performed, as described above.

Figure 12:
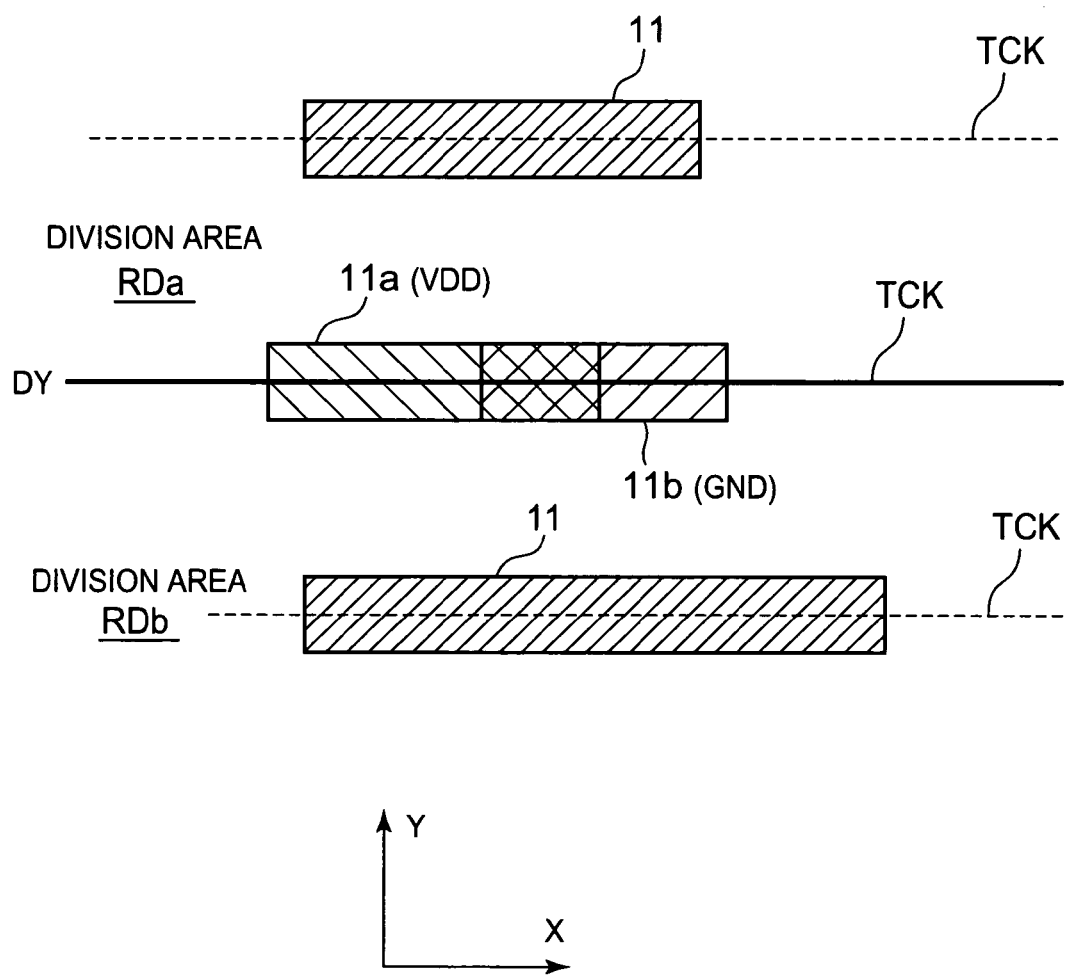
FIG. 12 is a conceptual diagram showing an effect of the embodiment of the present invention.

As a comparative example, a case is considered where no division boundary shift process is performed. FIG. 12 is a diagram showing such a case. In FIG. 12, the division areas RDa and RDb are adjacent to each other with the division boundary DY therebetween. Here, it is assumed that the division boundary DY is in parallel with the wiring tracks TCK and overlaps one of the wiring tracks TCK. However, in this comparative example, no process of shifting the division boundary DY is performed.

In this case, the wiring track TCK overlapping the division boundary DY exists both in the division area RDa and in the division area RDb. Therefore, by performing dummy pattern disposition processes with respect to the division areas RDa and RDb, different dummy patterns may be disposed on the wiring track TCK. For example, assume that by performing a dummy pattern disposition process with respect to the division area RDa, a dummy pattern 11a coupled to a power supply line VDD is disposed on the wiring track TCK. On the other hand, assume that by performing a dummy pattern disposition process with respect to the division area RDb, a dummy pattern 11b coupled to a ground line GND is disposed on the same wiring track TCK. In this case, when combining the division areas RDa and RDb, a short circuit occurs.

According to this embodiment, the division boundary DY parallel with the wiring tracks TCK is shifted so as not to overlap the wiring tracks TCK. As a result, the state shown in FIG. 11 is obtained so that occurrence of a short circuit is prevented.

2. Second Exemplary Embodiment

Figure 13:
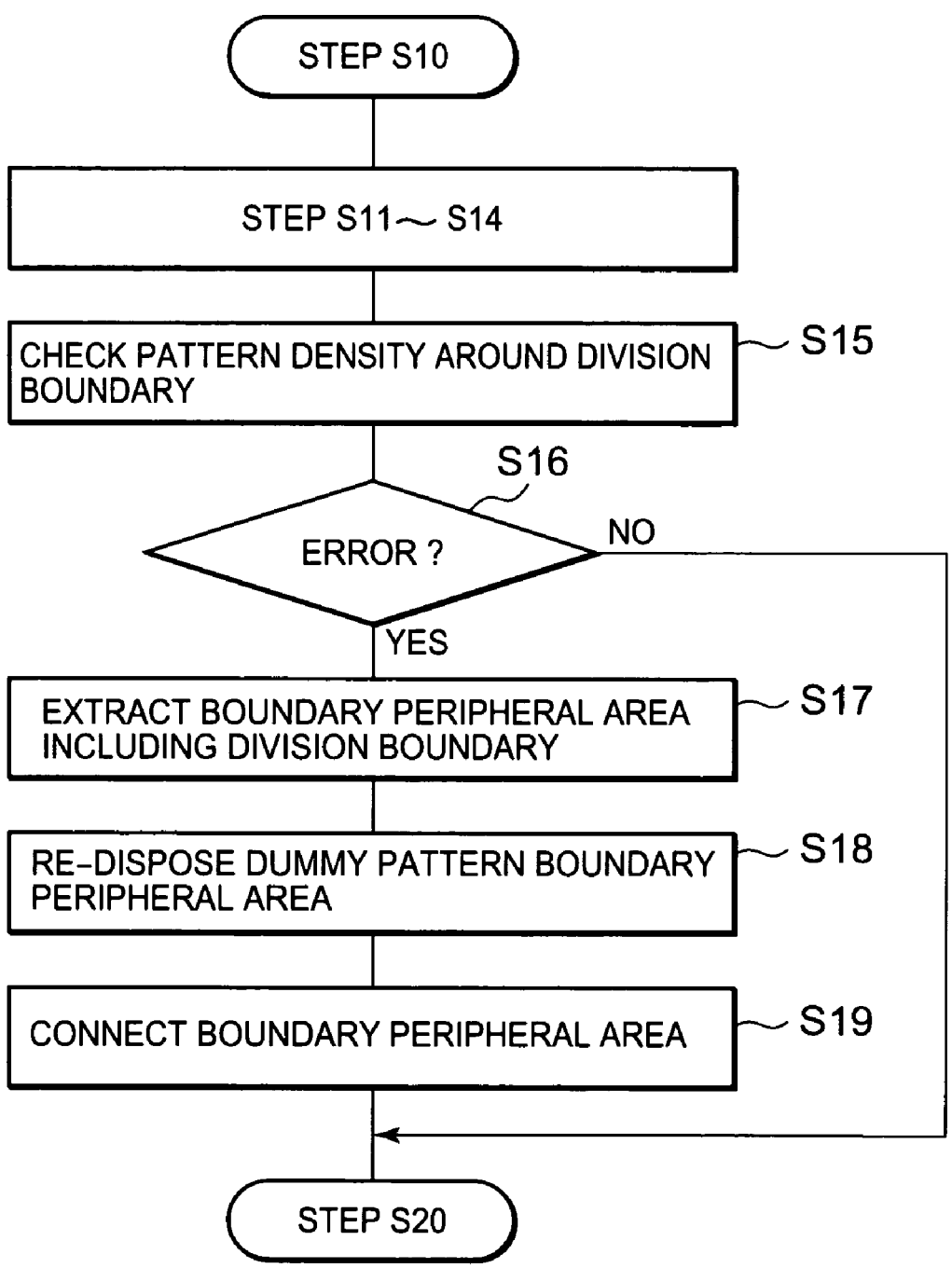
FIG. 13 is a flowchart showing a method for designing a semiconductor integrated circuit according to a second embodiment of the present invention.

As described in the first exemplary embodiment, the pattern density is checked in each division area RD (step S13). However, after combining the division areas RD (step S14), a pattern density error may occur around any division boundary. A process performed in this case will be described. FIG. 13 is a flowchart showing a dummy pattern addition process (step S10) according to a second exemplary embodiment. The description of the second exemplary embodiment overlapping the description of the first exemplary embodiment will be omitted as necessary.

Figure 14:
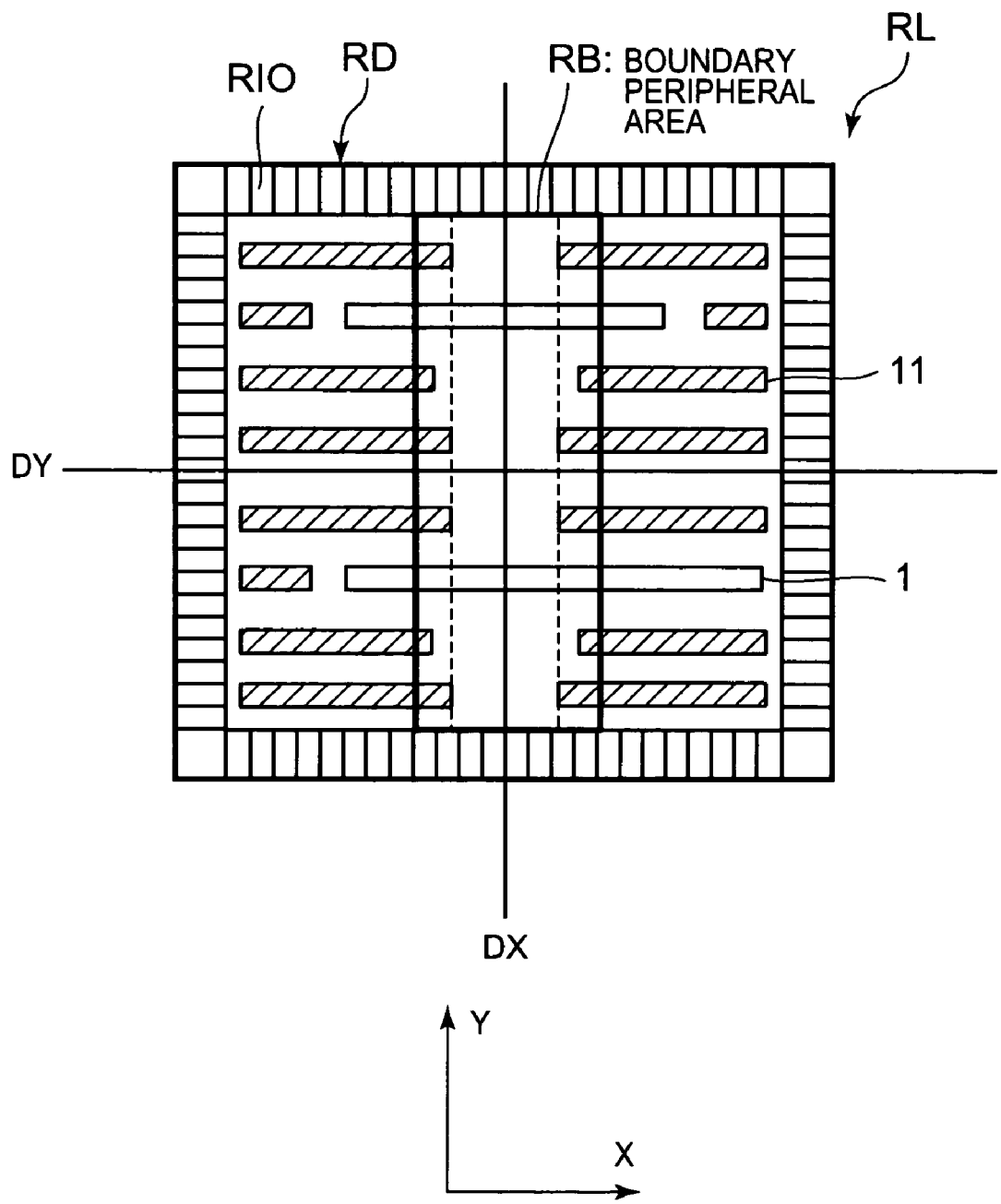
FIG. 14 is a conceptual diagram showing an example of a boundary peripheral area.

Steps S11 to S14 in the second embodiment are the same as those in the first embodiment. FIG. 14 shows an example of the layout area RL. In an example shown in FIG. 14, the wiring pattern 1 and dummy pattern 11 are disposed along the X direction. In step S18, the layout area RL is divided into four division areas RD by the division boundaries DX and DY. The division boundary DX intersects the X direction, while the division boundary DY is in parallel with the X direction. In step S12, a setback process is performed with respect to the division boundary DX intersecting the X direction. In step S13, the dummy pattern 11 is disposed so that the pattern density satisfies a predetermined criterion in each division area RD. In step S14, the four division areas RD are combined so that a layout shown in FIG. 14 is obtained.

Step S15: After step S14, it is checked whether the pattern density satisfies a predetermined criterion with respect to the layout area RL at a chip level. A technique for checking the pattern density is, for example, the same as that shown in FIG. 8. As described above, the pattern density has been checked in each division area RD (step S13). Therefore, if a pattern density error occurs, it occurs around the division boundary DX or DY. Therefore, in step S15, it is sufficient that the pattern density is checked at least around the division boundaries DX and DY. As is understood from the above-description, this is advantageous in that the number of positions to be checked is small.

Step S16: If no pattern density error is detected (step S16: No), then the process proceeds to step S20. On the other hand, if a pattern density error is detected (step S16: Yes), the following process is performed.

Step S17: First, a "boundary peripheral area RB" including a division boundary around which a pattern density error has been detected is extracted from the layout area RL. For example, a pattern density error may occur around the division boundary DX with respect to which a setback process has been performed. In this case, a boundary peripheral area RB including the division boundary DX is extracted. If a pattern density error also occurs around the division area DY, then a cross-shaped boundary peripheral area RB including the division boundaries DX and DY is extracted.

In an example shown in FIG. 14, an area having a relatively low pattern density occurs around the division boundary DX. Here, assume that it has been detected that the pattern density around the division boundary DX does not satisfy a predetermined criterion. Therefore, as shown in FIG. 14, the boundary peripheral area RB including the division boundary DX is extracted from the layout area RL. The shape of the boundary peripheral area RB is, for example, rectangular. The boundary peripheral area RB includes fragments of already disposed dummy patterns 11.

Figure 15:
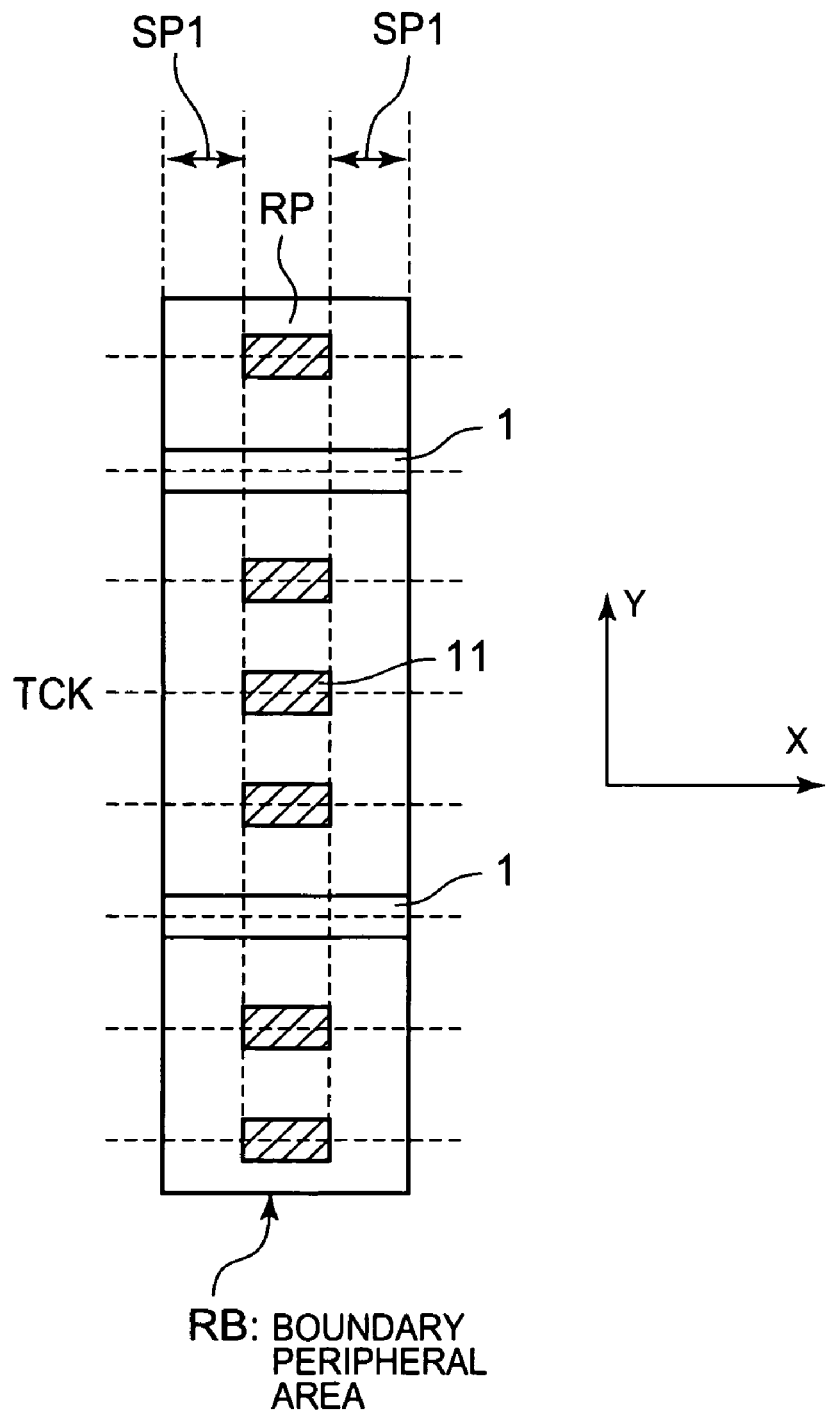
FIG. 15 is a conceptual diagram showing an example of a dummy pattern re-disposition process (step S18)

Step S18: Next, the dummy pattern 11 is re-disposed in the extracted boundary peripheral area RB. FIG. 15 is an example of the re-disposition of the dummy pattern 11. In an example shown in FIG. 15, the dummy pattern 11 is disposed according to algorithms similar to those in steps S12 and S13. Specifically, setback processes are performed with respect to sides intersecting the wiring tracks TCK among the sides of the boundary peripheral area RB. Thus, the dummy pattern disposition area RP is determined (see step S12). Then, the dummy pattern 11 is disposed in the dummy pattern disposition area RP. At that time, the dummy pattern 11 is re-disposed so that the pattern density of the boundary peripheral area RB satisfies the predetermined criterion (see step S13).

Figure 16:
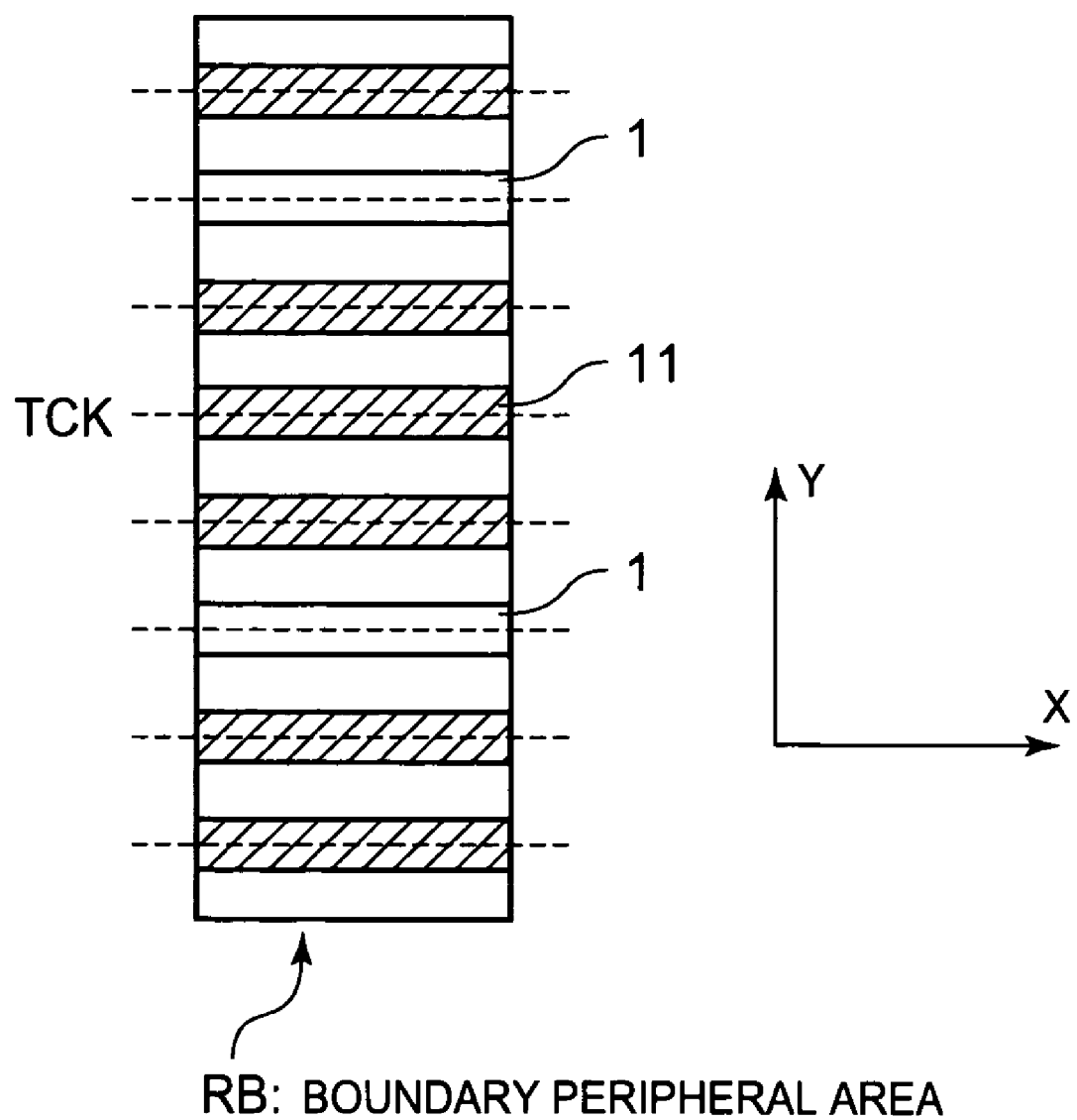
FIG. 16 is a conceptual diagram showing another example of the dummy pattern re-disposition process (step S18)

However, if the dummy pattern 11 is disposed in a small boundary peripheral area RB as shown in FIG. 15, then a great number of small patterns may be generated. In this case, the time required to create a mask pattern may be increased. Therefore, as shown in FIG. 16, new dummy patterns 11 may be disposed in such a manner that fragments of the existing dummy patterns 11 included in the boundary peripheral area RB are connected. This prevents generation of small patterns, thereby reducing the time required to create a mask pattern.

Step S19: After step S18, the boundary peripheral area RB is returned to the layout area RL and connected thereto. Thus, the pattern density error around the division boundary is eliminated.

3. Design System

The design technique according to the above-described exemplary embodiment of the present invention may be realized by a computer system. In particular, the design technique is preferably realized by a computer system for performing simultaneous distributed processes. Such a distributed processing system can be constructed by those skilled in the art as appropriate.

Figure 17:
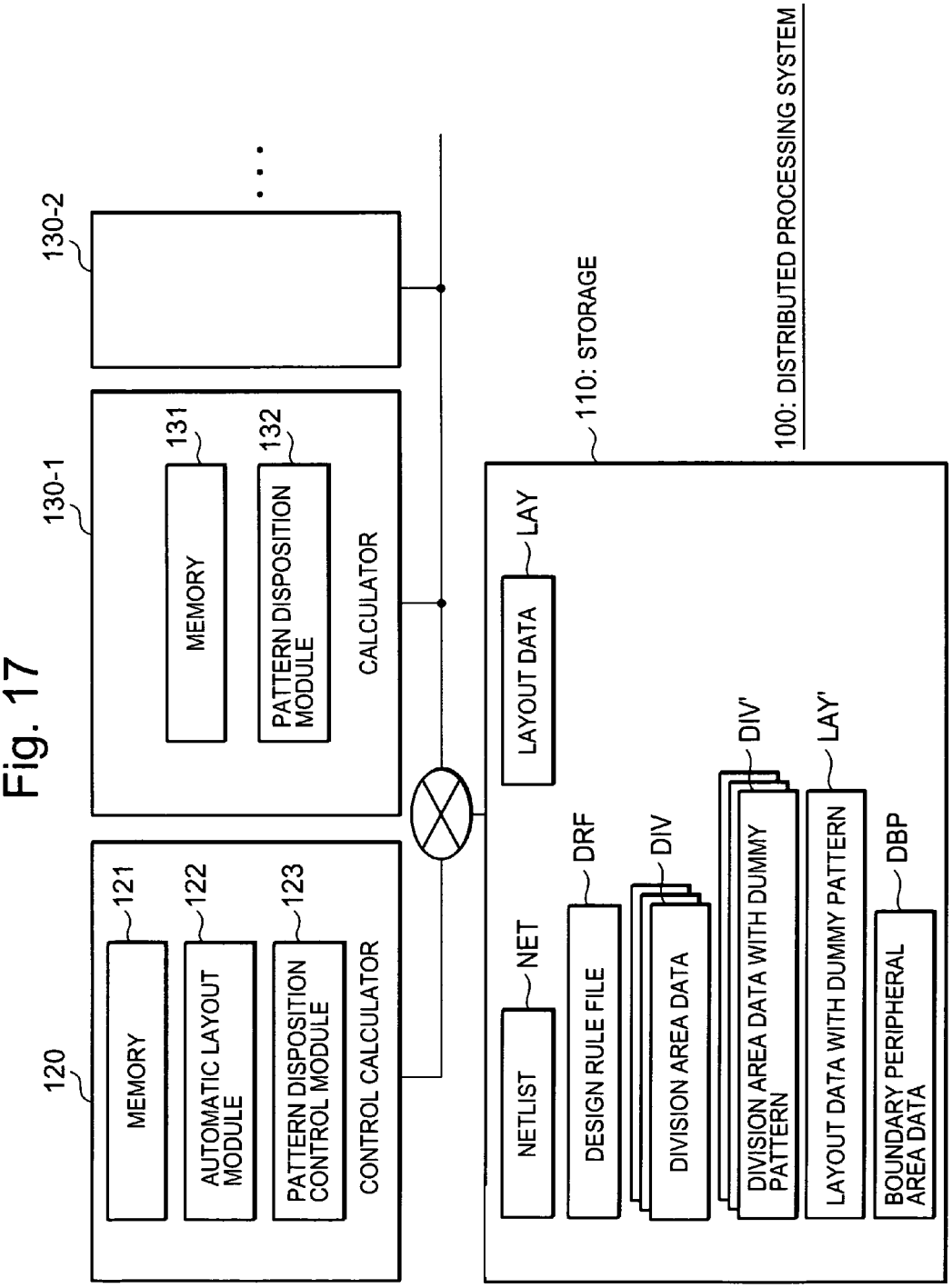
FIG. 17 is a block diagram showing an example configuration of a distributed processing system according to the embodiments of the present invention.

FIG. 17 shows an exemplary configuration of a distributed processing system 100. The distributed processing system 100 includes a storage 110, a control calculator 120, and multiple calculators 130. The storage 110, control calculator 120, and multiple calculators 130 are coupled to one another via a network. A hard disk exemplifies the storage 110. A workstation exemplifies the control calculator 12 and calculators 130.

The storage 110 stores a netlist NET, layout data LAY, a design rule file DRF, division area data DIV, division area data with dummy pattern DIV', layout data with dummy pattern LAY', boundary peripheral area data DBP, and the like.

The control calculator 120 includes a memory 121, an automatic layout module 122, and a pattern disposition control module 123. The automatic layout module 122 is realized by collaboration between a calculation processing device and a software program, and provides a function of the above-described step S1. The pattern disposition control module 123 is realized by collaboration between a calculation processing device and a software program, and provides functions of the above-described steps S11, S12, S14 to S19, and S20.

The calculators 130 each include a memory 131 and a pattern disposition module 132. The pattern disposition module 132 is realized by collaboration between a calculation processing device and a software program, and provides a function of the above-described step S13.

First, the automatic layout module 122 reads the netlist NET and design rule file DRF of a designed circuit from the storage 110. The netlist NET indicates the connection relations in the designed circuit. The design rule file DRF indicates the design rule of the designed circuit. The automatic layout module 122 performs a disposition wiring process on the basis of the netlist NET and design rule file DRF so as to create the layout data LAY. The layout data LAY represents a layout of the designed circuit (see FIG. 2). The automatic layout module 122 stores the created layout data LAY in the storage 110.

Next, the pattern disposition control module 123 reads the layout data LAY and design rule file DRF from the storage 110. Then, the pattern disposition control module 123 divides the layout area RL in which a wiring pattern is disposed, on the basis of the layout data LAY (step S11; see FIG. 3).

Also, the pattern disposition control module 123 refers to the design rule file DRF to determine the dummy pattern disposition area RP with respect to each division area RD (step S12; see FIGS. 4 to 6). Then, the pattern disposition control module 123 creates multiple pieces of division area data DIV corresponding to the multiple division areas RD. The pieces of division area data DIV each represent the layout of the corresponding division area RD and the determined dummy pattern disposition area RP. The pattern disposition control module 123 stores the created multiple pieces of division area data DIV in the storage 110.

Subsequently, the pattern disposition control module 123 instructs the multiple calculators 130 to perform dummy pattern disposition processes (step S13). The multiple calculators 130 perform the dummy pattern disposition processes "simultaneously" with respect to the multiple division areas RD.

Specifically, the multiple calculators 130 read the multiple pieces of division area data DIV from the storage 110. Or the pattern disposition control module 123 distributes the multiple pieces of division area data DIV to the multiple calculators 130. Then, the pattern disposition module 132 of each calculator 130 adds a dummy pattern and checks the pattern density on the basis of the received division area data DIV (step S13; see FIGS. 7 and 8). Thus, division area data with dummy pattern DIV' to which a dummy pattern has been added is created. The pattern disposition module 132 stores the created division area data with dummy pattern DIV' in the storage 110 or sends the data back to the control calculator 120.

The pattern disposition control module 123 acquires pieces of division area data with dummy pattern DIV' corresponding to the multiple division areas RD. Then, the pattern disposition control module 123 combines the multiple division areas RD, to each of which a dummy pattern has been added (step S14; see FIG. 9). Thus, layout data with dummy pattern LAY' is created. The pattern disposition control module 123 stores the created layout data with dummy pattern LAY' in the storage 110.

The pattern disposition control module 123 performs steps S15 to S19 as necessary. The boundary peripheral area data DBP is data representing the boundary peripheral area RB extracted in step S17. The pattern disposition control module 123 refers to the boundary peripheral area data DBP to re-dispose the dummy pattern (step S18; see FIGS. 14 to 16).

In this way, the process according to the embodiment of the present invention is realized. The pattern disposition control module 123 and pattern disposition module 132 provide a function of adding a dummy pattern to the layout data LAY to create the layout data with dummy pattern LAY'.

As described above, the dummy pattern disposition processes are performed simultaneously by the multiple calculators 130. As a result, the design TAT is reduced. Also, since the division area data DIV is created by dividing the layout data LAY, the amount of one piece of division area data DIV to be processed by one of the calculators 130 is reduced. As a result, the processing speed becomes higher than that in a case where a dummy pattern process is performed with respect to the entire chip. This also helps reduce the design TAT.

While the invention has been described in terms of several exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. A method of designing a semiconductor integrated circuit, said method comprising:
dividing a layout area in which a wiring pattern is disposed, into a plurality of division areas, as executed by a processing unit on a computer;
determining a dummy pattern disposition area provided in each of the plurality of division areas, the dummy pattern disposition area being arranged away from at least one of boundaries between a corresponding division area of the plurality of division areas and adjacent division areas;
adding a dummy pattern to the dummy pattern disposition area of each of the plurality of division areas; and
combining division areas to which the dummy pattern is added
wherein said dummy pattern disposition area is defined inside respective ones of said division areas, and
wherein said dummy pattern disposition area is larger than an area of said dummy pattern.

2. The method according to claim 1, wherein:
the wiring pattern and the dummy pattern are disposed along a first direction, the boundaries include a first boundary intersecting the first direction, and each said dummy pattern disposition area is located away from the first boundary by a predetermined distance.

3. The method according to claim 2, wherein:
the predetermined distance is a smallest wiring interval defined by a design rule.

4. The method according to claim 2, wherein:
the boundaries include a second boundary parallel with the first direction, and
the dummy pattern disposition area is located on the second boundary.

5. The method according to claim 4, wherein:
the dummy pattern is disposed on a plurality of wiring tracks running along the first direction, the determining includes:
if the second boundary overlaps any of the wiring tracks, parallel-moving the second boundary to a position at which the second boundary does not overlap any of the wiring tracks; and
determining the dummy pattern disposition area.

6. The method according to claim 1, wherein:
the dummy pattern is coupled to one of a power supply line and a ground line.

7. The method according to claim 1, wherein in the adding, the dummy pattern is disposed so that pattern densities of the division areas each satisfy a predetermined criterion.

8. The method according to claim 7, further comprising:
after the combining, checking whether pattern densities around the boundaries each satisfy the predetermined criterion.

9. The method according to claim 8, further comprising:
if a pattern density around a boundary of the boundaries does not satisfy the predetermined criterion in the checking, extracting a boundary peripheral area including the boundary from the layout area; and
re-disposing a dummy pattern in the boundary peripheral area so that a pattern density of the boundary peripheral area satisfies the predetermined criterion.

10. The method according to claim 1, wherein the adding is simultaneously performed with respect to the plurality of division areas.

11. A system for designing a semiconductor integrated circuit, said system comprising:
a storage which stores a layout data representing a wiring pattern;
a first calculator which determines a dummy pattern disposition area provided in each of a plurality of division areas, the dummy pattern disposition area being located away from at least one of boundaries between a corresponding division area of the division areas and adjacent division areas,
the first calculator providing a plurality of division area data with respect to the plurality of division areas, the plurality of division area data each representing a layout of a corresponding division area and a corresponding dummy pattern disposition area, and the first calculator reading the layout data from the storage and divides a layout area in which the wiring pattern is disposed, into a plurality of division areas; and
a plurality of second calculators which receives the plurality of division area data and simultaneously performs adding a plurality of dummy patterns to the dummy pattern disposition areas,
wherein the first calculator receives the plurality of division area data to which the dummy patterns have been added, and combines the plurality of division areas,
wherein said dummy pattern disposition area is defined inside respective ones of said division areas, and
wherein said dummy pattern disposition area is larger than an area of one of said dummy patterns.

12. The method according to claim 1, wherein the dummy pattern is disposed on a plurality of wiring tracks running along a predetermined direction, the wiring pattern and the dummy pattern being disposed along the predetermined direction.

13. The method according to claim 1, wherein in the determining the dummy pattern disposition area, if a boundary overlaps one of wiring tracks running along a predetermined direction, the boundary is parallel-moved to a position at which the boundary does not overlap the one of the wiring tracks.

14. The method according to claim 1, wherein the wiring pattern and the dummy pattern are disposed on wiring tracks running along a predetermined direction.

15. The method according to claim 1, wherein the wiring pattern is divided by said boundaries.

16. The system according to claim 11, wherein the dummy patterns are disposed on a plurality of wiring tracks running along a predetermined direction, the wiring pattern and the dummy patterns being disposed along the predetermined direction.

17. The system according to claim 11, wherein in the determining the dummy pattern disposition area in the first calculator, if a boundary overlaps one of wiring tracks running along a predetermined direction, the boundary is parallel-moved to a position at which the boundary does not overlap the one of wiring tracks.

18. The system according to claim 11, wherein the wiring pattern and the dummy patterns are disposed on wiring tracks running along a predetermined direction.

* * * * *